US010451237B1

(12) United States Patent
Zorn

(10) Patent No.: US 10,451,237 B1
(45) Date of Patent: Oct. 22, 2019

(54) LIGHTING DEVICE OF A MOTOR VEHICLE HEADLIGHT

(71) Applicant: ZKW Group GmbH, Wieselburg (AT)

(72) Inventor: Jürgen Zorn, Rossatz (AT)

(73) Assignee: ZKW GROUP GMBH, Wieselburg (AT)

( * ) Notice: Subject to any disclaimer, the term of this patent is extended or adjusted under 35 U.S.C. 154(b) by 44 days.

(21) Appl. No.: 15/771,232

(22) PCT Filed: Oct. 11, 2017

(86) PCT No.: PCT/AT2017/060260
§ 371 (c)(1),
(2) Date: Apr. 26, 2018

(87) PCT Pub. No.: WO2018/094431
PCT Pub. Date: May 31, 2018

(30) Foreign Application Priority Data

Nov. 22, 2016 (AT) .............................. A 51057/2016

(51) Int. Cl.
*B60Q 1/00* (2006.01)
*F21S 41/143* (2018.01)
(Continued)

(52) U.S. Cl.
CPC ............. *F21S 41/143* (2018.01); *F21S 41/25* (2018.01); *F21S 41/321* (2018.01); *F21S 41/365* (2018.01); *F21S 41/43* (2018.01)

(58) Field of Classification Search
None
See application file for complete search history.

(56) References Cited

U.S. PATENT DOCUMENTS 7,207,705 B2 4/2007 Ishida
7,416,322 B2 8/2008 Tanaka et al.
(Continued)

FOREIGN PATENT DOCUMENTS

JP 2005-276805 A 10/2005
JP 2015-153577 A 8/2015

OTHER PUBLICATIONS

Search Report issued in Austrian Application No. A 51057/2016, dated Jul. 25, 2017 (4 pages).
(Continued)

*Primary Examiner* — Elmito Breval
(74) *Attorney, Agent, or Firm* — Eversheds Sutherland (US) LLP

(57) ABSTRACT

A lighting device (1) comprising:
- a first light source arrangement (2),
- a light-shaping device (3) arranged after the first light source arrangement (2),
- a first reflector (4,4') having a first focal point (f1) and a second reflector (5, 5') having a second focal point (f2),
- an additional second light source arrangement (6), which is arranged outside on the second reflector (5, 5'), wherein a recess is provided for this purpose on the second reflector (5, 5'), and
- a termination plate (8) positioned in the exit opening of the second reflector (5, 5'), wherein the light emitted from the light source arrangement (2) is directed by means of the light-shaping device (3) onto the first reflector (4, 4'), wherein the first reflector (4, 4') deflects the light beams onto the second reflector (5, 5'), and the light beams reflected by the second reflector (5, 5') are cast out in a desired exit direction by the termination plate (8) in the form of a defined light distribution, wherein the
(Continued)

Figure 1:
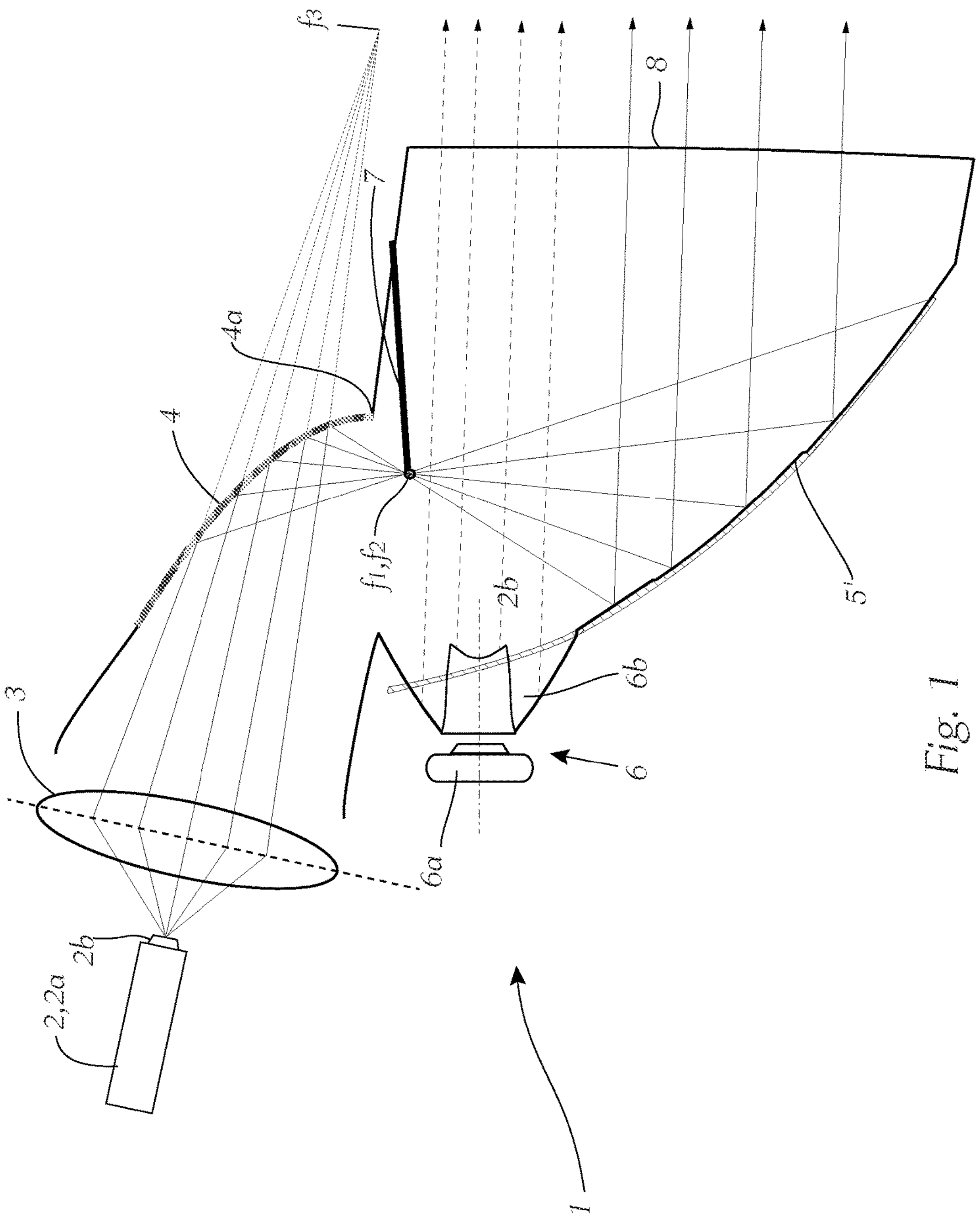

second light source arrangement (6) casts out an additional light output in the desired exit direction.

26 Claims, 5 Drawing Sheets

(51) Int. Cl.

| | |
|---|---|
| ***F21S 41/25*** | (2018.01) |
| ***F21S 41/43*** | (2018.01) |
| ***F21S 41/365*** | (2018.01) |
| ***F21S 41/32*** | (2018.01) |

(56) References Cited

U.S. PATENT DOCUMENTS

| | | | |
|---|---|---|---|
| 2006/0126353 | A1 | 6/2006 | Ishida |
| 2009/0027911 | A1 | 1/2009 | Misawa et al. |
| 2015/0103548 | A1 | 4/2015 | Reitinger et al. |

OTHER PUBLICATIONS

International Search Report for PCT/AT2017/060260, dated Jan. 4, 2018 (2 pages).

LIGHTING DEVICE OF A MOTOR VEHICLE HEADLIGHT

The invention relates to a lighting device of a motor vehicle headlight.

Numerous arrangements and configurations of reflective and/or refractive elements and of a light source for providing a defined light distribution are already known from the prior art.

Inter alia, document DE 10 2005 054 660 A1 presents a device in which the usage factor of a light beam bundle from a light-emitting element can be improved and controlled, wherein a special form of a reflection surface of a primary reflector for this purpose is provided in a configuration in which a vehicle lighting device comprises a primary and a secondary reflector.

Patent specification U.S. Pat. No. 7,207,705 B2 also discloses a vehicle headlight having a first and a second reflector, and an additional third reflector, which is arranged beneath a light source so as to attain a defined light distribution and to improve the usage factor of a light beam bundle from a light-emitting element.

There is, however, quite generally a desire for more functionalities so as to provide a defined or adaptable light distribution in front of a vehicle.

The object of the present invention is therefore to provide a lighting device having the possibility of a variable design of the superimposition regions within a legally compliant light distribution.

This object is achieved with a lighting device as described at the outset in that, in accordance with the invention, the lighting device comprises:

- a first light source arrangement, comprising at least one laser device and at least one lighting surface comprising a light conversion element,
- a light-shaping device arranged after the first light source arrangement,
- a first reflector having a first focal point and a second reflector having a second focal point, wherein the two reflectors form an optics system,
- an additional second light source arrangement, which is arranged outside on the second reflector with respect to the reflecting surface of the second reflector, wherein a recess is provided for this purpose on the second reflector so that the light irradiated from the second light source arrangement is cast out in substantially the same direction as the light beams reflected by the second reflector, and
- a termination plate position in the exit opening of the second reflector for use of a common projection of the first and second light source arrangement, wherein the light emitted from the light source arrangement is directed by means of the light-shaping device onto the first reflector arranged opposite the first light source arrangement in the irradiation direction, wherein the first reflector deflects the light beams in the first focal point in a bundled manner onto the second reflector, which is designed and arranged relative to the first reflector in such a way that the first focal point of the first reflector is substantially coincident with the second focal point of the second reflector, and the light beams reflected by the second reflector are cast out in a desired exit direction, preferably the direction of travel, by the termination plate in the form of a defined light distribution, wherein the second light source arrangement casts out an additional light output, having an irradiation characteristic different from the first light source arrangement, in the desired exit direction through the recess in the second reflector and the termination plate.

The legally compliant light distribution is composed here of a central region, which is formed substantially by the first light source arrangement, and an edge region, which is formed substantially by the second light source arrangement. The edge region of the legally compliant light distribution can be shaped by the arrangement or the variable activation (as required) of the second light source arrangement.

The advantage of using a laser device or laser light source is the associated high luminance, so as to create a spot of high illuminance, wherein an additional light source, which can be arbitrarily activated as required to contribute to the produced light distribution, ensures a desired high luminous flux.

The at least one second light source arrangement is advantageously arranged in a region of the second reflector in which substantially no light of the first light source arrangement is directed from the first reflector, so as to utilise the unused reflection surface or light irradiation surface for possible light functions, with practically the same overall size of the device.

By means of the above-described, selected position for the second light source arrangement, it is ensured that the irradiated light of the second light source arrangement is cast out at the first or second reflector through the termination plate, without a deflection or reflection process.

It can be provided that the second light source arrangement comprises at least one light source.

It is also favourable if the at least one light source of the second light source arrangement is formed as an LED light source.

LED light sources of this kind, which comprise one or more light-emitting diodes (LEDs), are being used increasingly in modem vehicle headlights, and ensure a high luminous flux gain alongside a small increase in illuminance. Here, standard LEDs and also high-power LEDs can be used.

It is advantageous if the first reflector is formed as a hyperbolic reflector having a first focal point and a first virtual focal point.

It is advantageously provided that the light-shaping device is formed in such a way that the light of the first light source arrangement is concentrated in the form of light beams on the first virtual focal point of the first reflector.

In one embodiment, it is provided that the first reflector is formed as a parabolic reflector having a first focal point.

Here, it is advantageous if the light-shaping device is formed as a collimator, wherein the collimator casts the light beams of the first light source arrangement onto the first reflector in the form of parallel light beams.

In a further embodiment, the second reflector is formed as a parabolic reflector having a second focal point.

It can also be provided that the second reflector is formed as a hyperbolic reflector having a second focal point and a second virtual focal point, wherein the second virtual focal point does not have to lie on a common axis with all other focal points provided, or, in other words, not all provided focal points have to lie on a common axis.

It is advantageous if the at least one light source of the second light source arrangement is arranged in the second virtual focal point of the second reflector.

It can be provided that the second light source arrangement comprises a TIR optics body.

It is expedient if the termination plate is flat or plane.

It can also be advantageous if the first reflector is formed as a totally reflective surface of a TIR optics.

The second reflector is advantageously formed as a totally reflective surface of a TIR optics.

It is also expedient if a beam diaphragm is provided between the first reflector and a second reflector in order to provide or optimise a light/dark line.

In accordance with a tried and tested development of the invention, the first reflector comprises active and/or passive safety systems, for example with regard to laser radiation.

It can be provided in an expedient embodiment that the optics system formed of the first and second reflector is formed in one piece.

It can also be provided that the optics system formed of the first and second reflector, the TIR optics system of the second light source arrangement, and the light-shaping device are formed in one piece.

The termination plate advantageously has one or more optical regions which are formed as light-shaping projection optics in order to align incident light beams horizontally and/or vertically in parallel.

It is of course clear that not all light beams incident on one of these optical regions are aligned in parallel, but instead those that are incident on the optical regions substantially from the focal point thereof.

In an expedient embodiment, the termination plate is constructed completely from one or more optical regions and can be formed in one piece with the optics system.

It can be provided that a lighting device of this kind can be used to produce the "main beam" light function, wherein the lighting device, in the case of this "main beam" light function, produces a light distribution which, when the lighting device is installed in a vehicle, produces a corresponding, legally compliant main beam distribution in front of the vehicle.

In an advantageous variant, a lighting device of this kind can be used to produce the "dipped beam" light function, wherein the lighting device, in the case of this "dipped beam" light function, produces a light distribution which, when the lighting device is installed in a vehicle, reduces a corresponding, legally compliant dipped beam distribution in front of the vehicle.

It can also be provided that a lighting device of this kind can be used to produce the "fog light" light function, wherein the lighting device, in the case of this "fog light" light function, produces a light distribution which, when the lighting device is installed in a vehicle, produces a corresponding, legally compliant fog light distribution in front of the vehicle.

It can also be favourable if a lighting device of this kind can be used to produce the "daytime running light" light function, wherein the lighting device, in the case of this "daytime running light" light function, produces a light distribution which, when the lighting device is installed in a vehicle, produces a corresponding, legally compliant daytime running light distribution in front of the vehicle.

Figure 2:
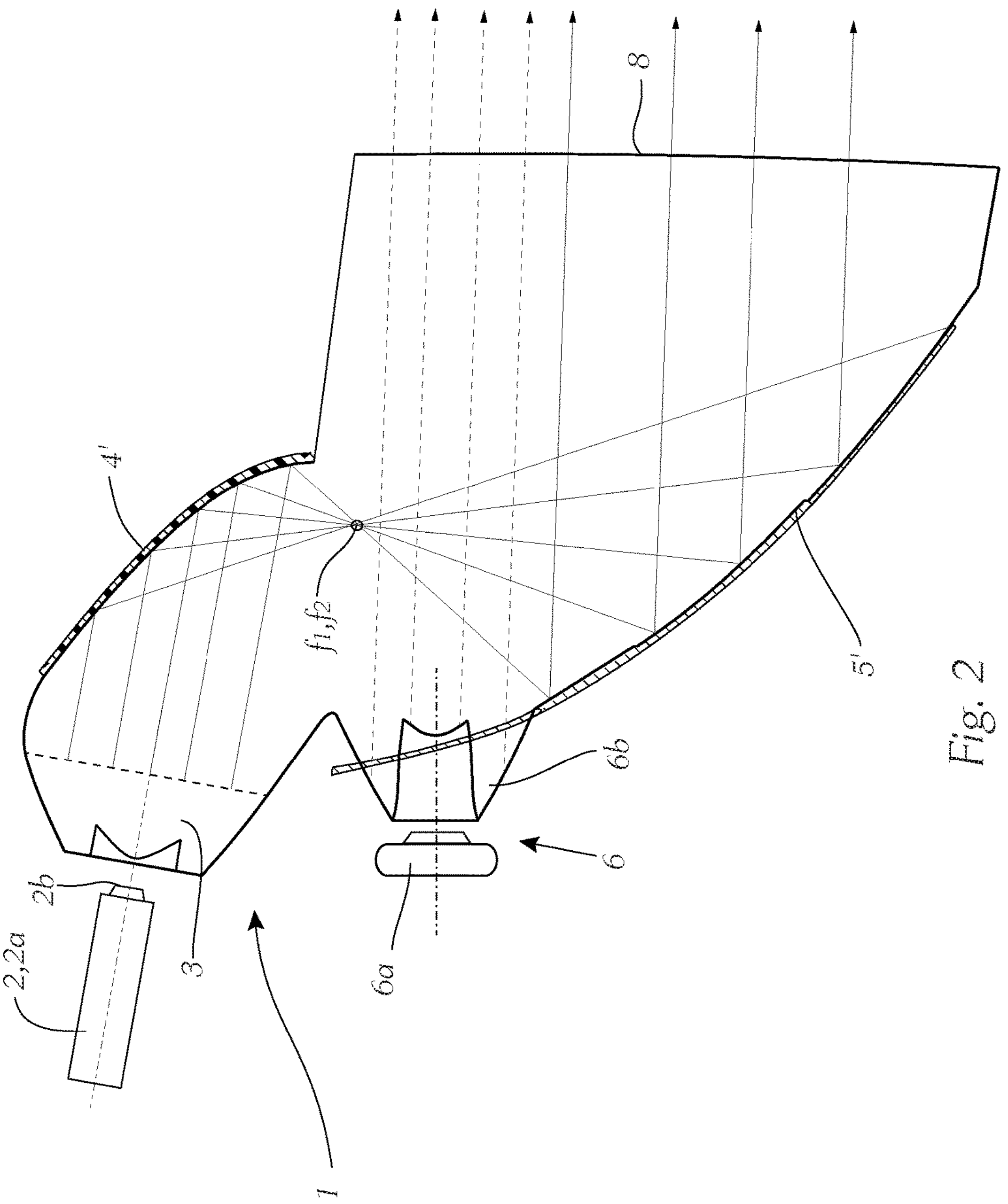
Figure 3:
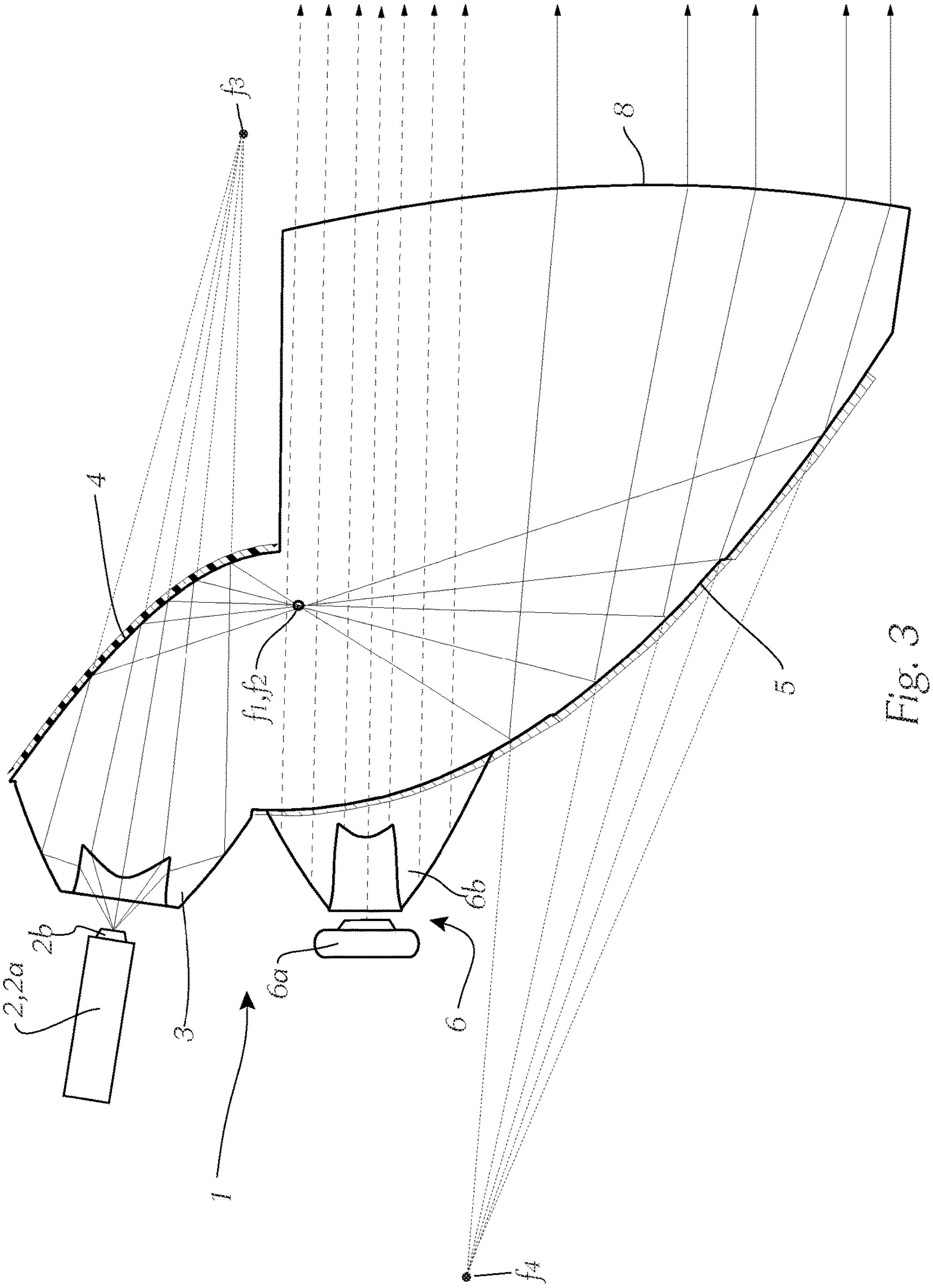
Figure 4:
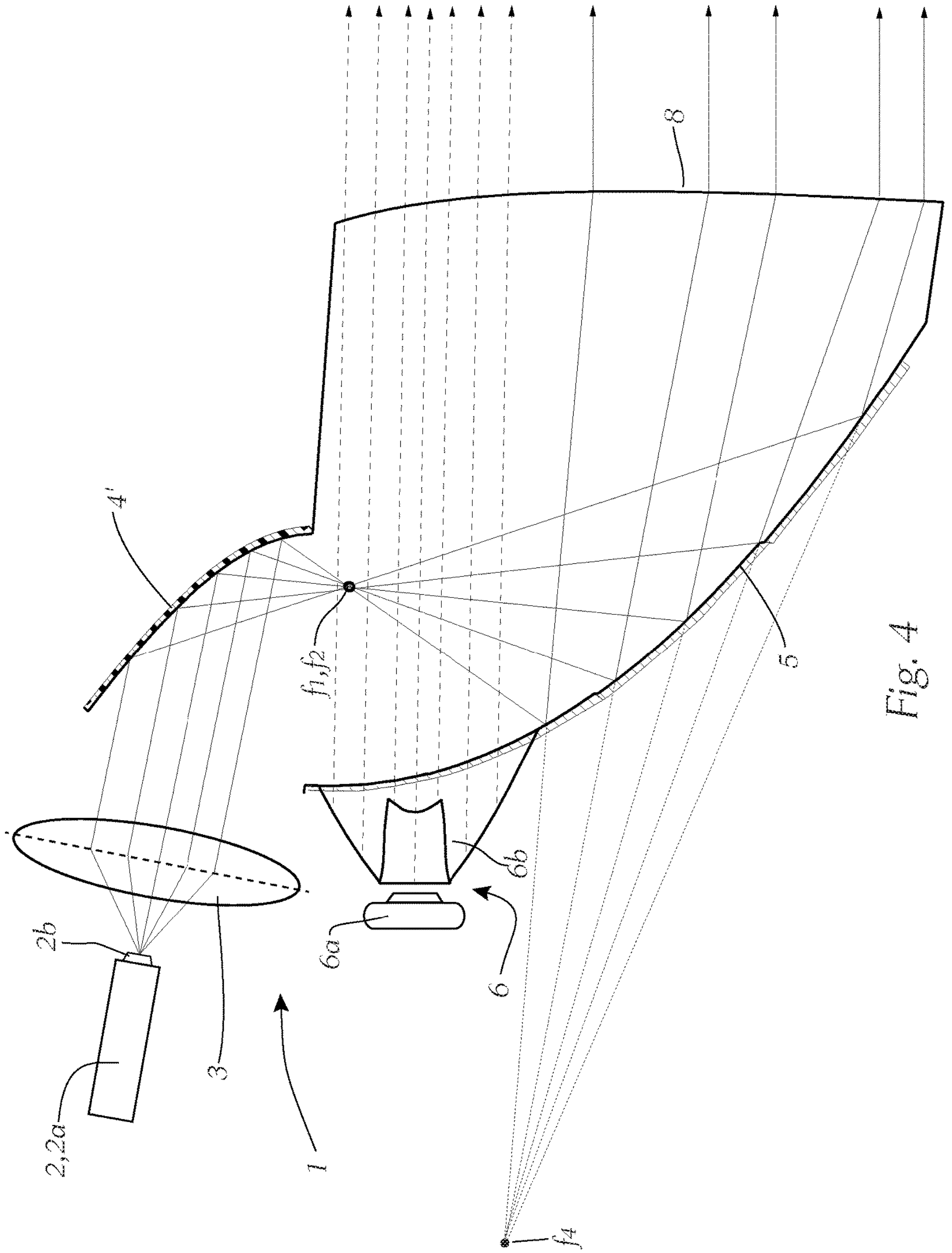
Figure 5:
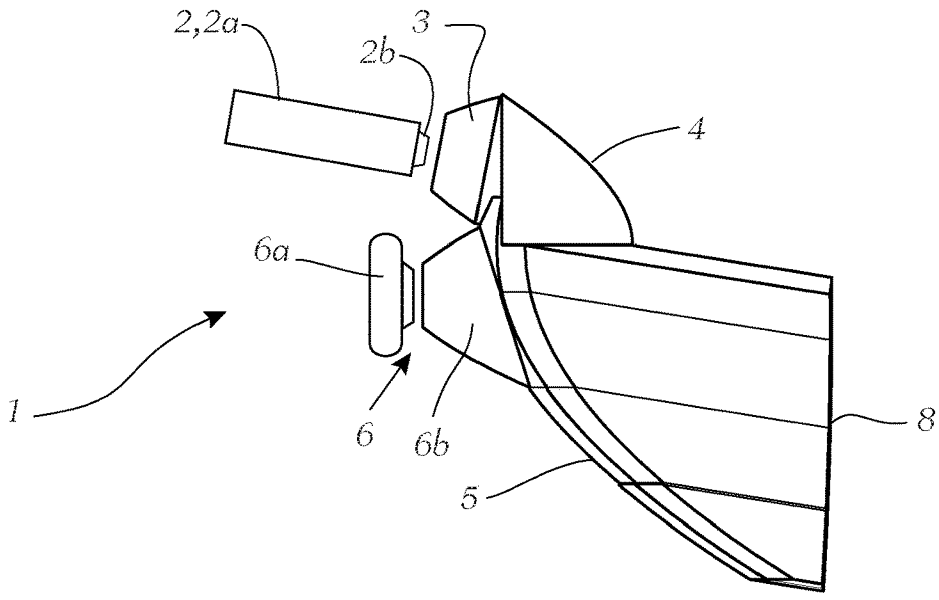
Figure 6:
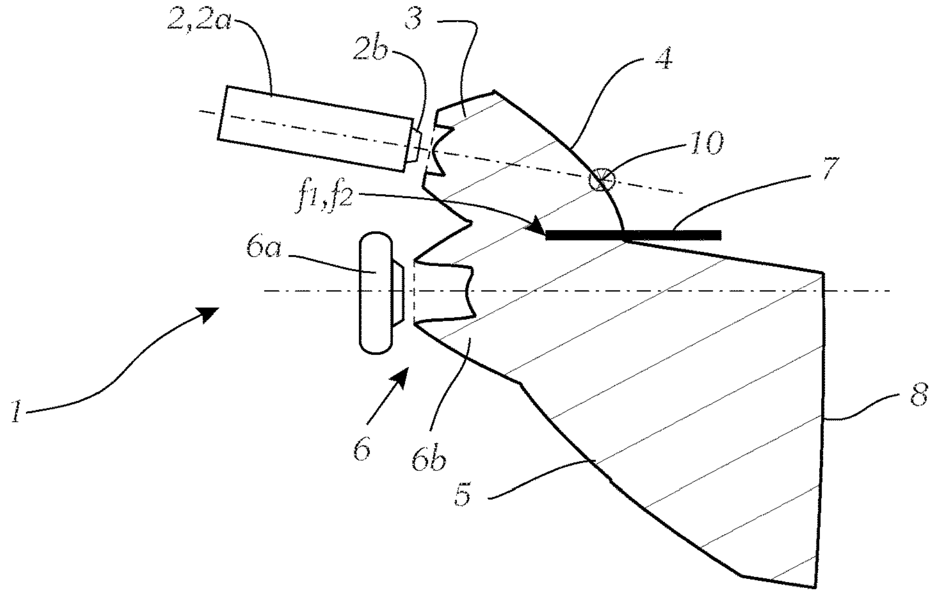

The invention will be explained in greater detail hereinafter with reference to drawings, in which FIG. 1 shows a cross-sectional view of an exemplary embodiment, FIG. 2 shows a cross-sectional view of a further example of the invention, FIG. 3 shows a cross-sectional view of a further exemplary embodiment, FIG. 4 shows a cross-sectional view of a further possible example, FIG. 5 shows a side view of a further exemplary embodiment, and FIG. 6 shows a cross-section through the exemplary embodiment from FIG. 5 with a beam diaphragm.

FIG. 1 shows an embodiment according to the invention of the lighting device 1 with a first light source arrangement 2, which is equipped with a laser device 2*a* and a light conversion element 2*b*.

Since laser devices generally irradiate coherent, monochromatic light or lights within a narrow wavelength range, but, in the case of a motor vehicle headlight, white mixed light is generally preferred or legally required for the irradiated light, what are known as light conversion elements 2*b* for converting substantially monochromatic light into white or polychromatic light are arranged in the irradiation direction of the laser device 2*a*, wherein the term "white light" is understood to mean light of a spectral composition which for humans gives the impression of a "white" colour. This light conversion element 2*b* is configured for example in the form of one or more photoluminescence converters or photoluminescence elements, wherein incident laser beams of the laser device 2*a* impinge on the light conversion element 2*b*, which generally comprises photoluminescence dye, and excite this photoluminescence dye to photoluminesce, wherein light is emitted in a wavelength or wavelength ranges different from the light of the irradiating laser device 2*a*. The light output of the light conversion element 2*b* in this case has characteristics of a Lambertian radiator.

In the case of light conversion elements 2*b*, a distinction is made between reflective and transmissive conversion elements.

The terms "reflective" and "transmissive" relate here to the blue component of the converted white light. In the case of a transmissive design, the main direction of propagation of the blue light component after having passed through the converter volume or conversion element is directed substantially in the same direction as the direction of propagation of the output laser beam. In the case of a reflective design, the laser beam is reflected or deflected at a boundary surface attributable to the conversion element, such that the blue light component has a different direction of propagation compared to that of the laser beam, which is generally embodied in the form of a blue laser beam.

The invention is in principle suitable both for transmissive and for reflective conversion elements, wherein a transmissive light conversion element 2*b* is shown in the exemplary drawings.

A light-shaping device 3 is arranged after the first light source arrangement 2 in the direction of irradiation of the first light source arrangement 2 so as to concentrate the irradiated light of the light conversion element on a virtual focal point f3 of the first reflector 4, 4' arranged opposite the first light source arrangement 2 in the irradiation direction, which reflector, in the example shown in FIG. 1, is formed as a hyperbolic reflector 4 or as a totally reflective surface of a TIR optics, wherein an advantage of a hyperbolic reflector is the possibility of increased beam bundling and a reduction of the overall installation space. The light reflected by the first reflector 4, 4' is deflected onto the second reflector 5, 5' in a manner bundled in a first focal point f1 of the first reflector 4, 4', which second reflector is designed and arranged relative to the first reflector 4, 4' in such a way that the first focal point f1 of the first reflector 4, 4' is substantially coincident with the second focal point f2 of the second reflector 5, 5', wherein the second reflector 5, 5' in the exemplary embodiment shown in FIG. 1 is formed as a parabolic reflector 5' or is a totally reflective surface of a TIR optics. The light beams reflected by the first reflector 4, 4' are cast out by the second reflector 5, 5' as substantially parallel light beams through the termination plate 8, which can be flat or plane in the case of a parabolic design of the second reflector 5', moreover in the form of a defined light distribution in a desired exit direction, wherein exemplary beam paths are shown in FIG. 1. Since the invention is not limited to certain types of motor vehicle headlights and can be applied, inter alia, to motor vehicle fog headlights, motor vehicle direction-indicator headlights and/or front motor vehicle headlights for main beam and/or dipped beam, and to certain lighting units therein, the desired exit direction is dependent on the particular field of use of the motor vehicle headlight in which the invention is applied, wherein the list of possible motor vehicle headlights is not exhaustive.

In order to provide or optimise a light/dark line for a dimmed light distribution, a beam diaphragm 7 is provided between the first and the second reflector 4, 4', 5, 5', as is shown schematically in FIGS. 1 and 6, and is positioned around the focal point.

As a result of the arrangement of the first reflector 4, 4' and of the second reflector 5, 5' relative to one another, a portion of the second reflector 5, 5' substantially not used optically, at which no light beams of the first light source arrangement 2 are directed from the first reflector 4, 4', is provided in regions close to the beam diaphragm 7 or the first and second focal point f1, f2.

In this region, the exit opening of the second light source arrangement 6 is arranged in a recess, provided for this purpose, in the second reflector 5, 5', which is formed as a TIR optics body 6*b* with at least one LED light source 6*a*, wherein this second light source arrangement 6 casts out, in the desired exit direction, an additional light output having any radiation characteristic different from the first light source arrangement 2.

Here, the light irradiated from the second light source arrangement 6 can be cast out without deflections in substantially the same direction as the light beam reflected by the second reflector 5, 5'.

Apart from LED light sources for the second light source arrangement 6, other light sources can also be used, which have an irradiation characteristic different from the light source arrangement 2. Conventional halogen lamps or HID gas discharge lamps with downstream beam-shaping element (by way of example in the form of conventional free-form reflectors) for producing a supplementary light distribution could be used for this purpose. The use of high-power LED light sources, however, offers the advantage of high luminous flux alongside a small light exit surface.

As can be seen for example in FIG. 6, interferences in the form of a passive safety system 9, for example surface structurings, steps or a hole, can be introduced in the reflection region of the beam bundle at the first reflector 4, 4' and in the event of a fault prevent or reduce an exit of laser beams of the laser device 2*a*. The same region can also be used for the placement of an active safety system. Since, in the case of the first reflector 4, 4'—embodied in particular as a hyperbolic reflector 4 or as a totally reflective surface of a TIR optics—a bundling of the light beams to the first virtual focal point f3 of the first reflector 4 is forced and the reflection region of the light beams at the first reflector 4 is not positioned directly in the light exit region of the optical overall system, the necessary interfering structures of the safety system 9 can be kept small.

Further possibilities or extensions of the laser safety concept are for example what are known as "radiation traps", which bear against the reflection surface of the first reflector 4, 4' from outside in the form of a laser-light-absorbing layer and transmit white mixed light and absorb laser light in the event of a malfunction or damage to the light conversion element 2*b*.

A further example of a laser safety concept is constituted by light sensors, which are arranged in safety-relevant positions and which each compare light intensities of the light emitted by the laser device 2*a* and light intensities of the light emitted by the light conversion element 2*b* at these positions with stored reference intensities of the particular radiation type measured during fault-free operation, wherein the laser device 2*a* is switched off automatically in the event that a previously set, permitted deviation is exceeded.

In a further exemplary embodiment, as shown in FIG. 2, the first reflector 4, 4' can be formed as a parabolic reflector 4' or as a totally reflective surface of a TIR optics, wherein the second reflector 5, 5' is formed as a parabolic reflector 5' or as a totally reflective surface of a TIR optics. The primary arrangement is substantially the same as the example shown in FIG. 1 and described above.

In FIG. 3 a further combination of the reflector designs is shown, wherein the first reflector 4, 4' is formed as a hyperbolic reflector 4 or as a totally reflective surface of a TIR optics, and the second reflector 5, 5' is formed as a hyperbolic reflector 5 or as a totally reflective surface of a TIR optics having a second virtual focal point f4. Exemplary beam paths are also shown in FIG. 3 with the aid of the second virtual focal point f4, wherein the primary arrangement is substantially equivalent to the previous examples, and wherein, in general, not all provided focal points f1, f2, f3, f4 have to lie on a common axis. Here, the termination plate 8, with a hyperbolic design of the second reflector 5, is formed as a lens or projection lens so as to produce a defined light distribution. Here, the termination plate 8 can have one or more different regions which are formed as projection optics so as to align incident light rays horizontally and/or vertically in parallel.

It can be said quite generally that the purpose of the termination plate 8 is to shape the incident light beams or light beam bundles in such a way that parallel light beams or light beam bundles are cast out, so as to thus produce a legally compliant light distribution. This can also apply to the second light source arrangement 6, since the TIR optics body of the second light source arrangement 6 aligns the light beams in parallel only to a limited extent, wherein the termination plate 8, in the region in which the light beams of the second light source arrangement 6 are incident, is also designed to align or shape the light beams in parallel. It is not necessary for this purpose for the light source 6*a* of the second light source arrangement 6 to be arranged in the focal point of the focal plane of the termination plate 8 or the corresponding optical region of the termination plate 8, but substantially the emission surface of the TIR optics body 6*b*, wherein here what is meant is the focal point or focal plane of the region of the termination plate 8 at which the light beams of the second light source arrangement 6 are substantially incident.

A further possible example is shown in FIG. 4. In this case the first reflector 4, 4' is formed as a parabolic reflector 4' or is a totally reflective surface of a TIR optics, and the second reflector 5, 5' is formed as a hyperbolic reflector 5' or as a totally reflective surface of a TIR optics.

Exemplary beam paths are also shown in FIG. 5 with the aid of the second virtual focal point f4, wherein the primary arrangement is substantially equivalent to the previous examples.

Configurations are also possible in which just one of the two reflectors 4, 4', 5, 5' is formed as a totally reflective surface of a TIR optics and the other is not.

In an exemplary embodiment the invention can be used to produce the "main beam" light function, wherein the lighting device 1, in the case of this "main beam" light function, produces a light distribution which, when the lighting device 1 is installed in a vehicle, produces a corresponding, legally compliant main beam distribution in front of the vehicle, wherein for this purpose the second light source arrangement 6 can function as a main beam that can be activated as required.

In a further embodiment a lighting device 1 of this kind can be used to produce the "dipped beam" light function, wherein the lighting device, in the case of this "dipped beam" light function, produces a light distribution which, when the lighting device 1 is installed in a vehicle, produces a corresponding, legally compliant dipped beam distribution in front of the vehicle.

In a further example a lighting device 1 of this kind can be used to produce the "fog light" light function, wherein the lighting device, in the case of this "fog light" light function, produces a light distribution which, when the lighting device 1 is installed in a vehicle, produces a corresponding, legally compliant fog light distribution or an adverse weather light distribution in front of the vehicle.

In a further embodiment a lighting device 1 of this kind can be used to produce the "daytime running light" light function, wherein the lighting device, in the case of this "daytime running light" light function, produces a light distribution which, when the lighting device 1 is installed in a vehicle, produces a corresponding, legally compliant daytime running light distribution in front of the vehicle.

The above-mentioned, listed light functions and light distributions are not exhaustive, wherein the lighting devices can also produce combinations of these light functions and/or produce only a partial light distribution, that is to say for example only part of a main beam, dipped beam, fog light or daytime running light distribution.

LIST OF REFERENCE SIGNS

1 . . . lighting device
2 . . . first light source arrangement
2*a* . . . laser device
2*b* . . . light conversion element
3 . . . light-shaping device
4 . . . first reflector (hyperbolic)
4' . . . first reflector (parabolic)
5 . . . second reflector (hyperbolic)
5' . . . second reflector (parabolic)
6 . . . second light source arrangement
6*a* . . . LED light source
6*b* . . . TIR optics body
7 . . . beam diaphragm
8 . . . termination plate
9 . . . safety system
f1 . . . first focal point
f2 . . . second focal point
f3 . . . first virtual focal point
f4 . . . second virtual focal point

The invention claimed is:

1. A lighting device (1) of a motor vehicle headlight, the lighting device (1) comprising:

a first light source arrangement (2), comprising at least one laser device (2*a*) and at least one lighting surface (2*b*) comprising a light conversion element;

a light-shaping device (3) arranged after the first light source arrangement (2);

a first reflector (4, 4') having a first focal point (f1) and a second reflector (5, 5') having a second focal point (f2), wherein the two reflectors (4, 4', 5, 5') form an optics system;

a second light source arrangement (6), which is arranged outside on the second reflector (5, 5') with respect to the reflecting surface of the second reflector (5, 5'), wherein a recess is provided for this purpose on the second reflector (5, 5') so that the light irradiated from the second light source arrangement (6) is cast out in substantially the same direction as the light beams reflected by the second reflector (5, 5') and a termination plate (8) position in an exit opening of the second reflector (5, 5') for use of a common projection of the first and second light source arrangement (2, 6), wherein the device is configured such that light emitted from the light source arrangement (2) is directed by means of the light-shaping device (3) onto the first reflector (4, 4') arranged opposite the first light source arrangement (2) in the irradiation direction, wherein the first reflector (4, 4') deflects the light beams in the first focal point (f1) in a bundled manner onto the second reflector (5, 5'), which is designed and arranged relative to the first reflector (4, 4') in such a way that the first focal point (f1) of the first reflector (4, 4') is substantially coincident with the second focal point (f2) of the second reflector (5, 5'), and the light beams reflected by the second reflector (5, 5') are cast out in a desired exit direction by the termination plate (8) in the form of a defined light distribution, wherein the second light source arrangement (6) casts out an additional light output, having an irradiation characteristic different from the first light source arrangement (2), in the desired exit direction through the recess in the second reflector (5, 5') and the termination plate (8).

2. The lighting device (1) according to claim 1, wherein the at least one second light source arrangement (6) is arranged in a region of the second reflector (5, 5') in which substantially no light of the first light source arrangement (2) is directed from the first reflector (4, 4').

3. The lighting device (1) according to claim 1, wherein the second light source arrangement (6) comprises at least one light source (6*a*).

4. The lighting device (1) according to claim 3, wherein the at least one light source (6*a*) of the second light source arrangement (6) is formed as an LED light source.

5. The lighting device (1) according to claim 1, wherein the first reflector (4, 4') is formed as a hyperbolic reflector (4) having a first focal point (f1) and a first virtual focal point (f3).

6. The lighting device (1) according to claim 5, wherein the light-shaping device (3) is formed in such a way that the light of the first light source arrangement (2) is concentrated in the form of light beams on the first virtual focal point (f3) of the first reflector (4).

7. The lighting device (1) according to claim 1, wherein the first reflector (4, 4') is formed as a parabolic reflector (4') having a first focal point (f1).

8. The lighting device (1) according to claim 7, wherein the light-shaping device (3) is formed as a collimator (3), wherein the collimator (3) is configured to cast the light beams of the first light source arrangement (2) onto the first reflector (4') in the form of parallel light beams.

9. The lighting device (1) according to claim 1, wherein the second reflector (5, 5') is formed as a parabolic reflector (5') having a second focal point (f2).

10. The lighting device (1) according to claim 9, wherein the second light source arrangement (6) comprises a TIR optics body (6*b*).

11. The lighting device (1) according to claim 10, wherein the optics system formed of the first and second reflector (4, 4', 5, 5'), the TIR optics system (6*b*) of the second light source arrangement (6), and the light-shaping device (3) are formed in one piece.

12. The lighting device (1) according to claim 9, wherein the termination plate (8) is flat or planar.

13. The lighting device (1) according to claim 1, wherein the second reflector (5, 5') is formed as a hyperbolic reflector (5) having a second focal point (f2) and a second virtual focal point (f4).

14. The lighting device (1) according to claim 13, wherein the at least one light source (6*a*) of the second light source arrangement (6) is arranged in the second virtual focal point (f4) of the second reflector (5).

15. The lighting device (1) according to claim 1, wherein the first reflector (4, 4') is formed as a totally reflective surface of a TIR optics.

16. The lighting device (1) according to claim 1, wherein the second reflector (5, 5') is formed as a totally reflective surface of a TIR optics.

17. The lighting device (1) according to claim 1, wherein a beam diaphragm (7) is provided between the first reflector (4, 4') and the second reflector (5, 5') in order to provide or optimise a light/dark line.

18. The lighting device (1) according to claim 1, wherein the first reflector (4, 4') comprises active and/or passive safety systems (9).

19. The lighting device (1) according to claim 1, wherein the optics system formed of the first and second reflector (4, 4', 5, 5') is formed in one piece.

20. The lighting device (1) according claim 1, wherein the termination plate (8) has one or more optical regions which are formed as light-shaping projection optics in order to align incident light beams horizontally and/or vertically in parallel.

21. The lighting device (1) according to claim 20, wherein the termination plate (8) is constructed completely from one or more optical regions and is formed in one piece with the optics system.

22. The lighting device (1) according to claim 1, which is configured to produce a main beam light function of a vehicle headlight.

23. The lighting device (1) according to claim 1, which is configured to produce a dipped beam light function of a vehicle headlight.

24. The lighting device (1) according to claim 1, which is configured to produce a fog light light function of a vehicle headlight.

25. The lighting device (1) according to claim 1, which is configured to produce a daytime running light light function of a vehicle headlight.

26. A motor vehicle headlight comprising one or more of the lighting devices according to claim 1.

* * * * *